No. 691,960. Patented Jan. 28, 1902.
J. McCAFFREY.
SHIPPER MECHANISM.
(Application filed June 12, 1901.)

(No Model.)

Witnesses:
Wm. H. Varnum.
W Stanley Campbell

Inventor:
John McCaffrey
By Henry J. Miller atty.

THE NORRIS PETERS CO., PHOTO-LITHO., WASHINGTON, D. C.

UNITED STATES PATENT OFFICE.

JOHN McCAFFREY, OF LAWRENCE, MASSACHUSETTS.

SHIPPER MECHANISM.

SPECIFICATION forming part of Letters Patent No. 691,960, dated January 28, 1902.

Application filed June 12, 1901. Serial No. 64,276. (No model.)

*To all whom it may concern:*

Be it known that I, JOHN McCAFFREY, a citizen of the United States, residing at Lawrence, in the county of Essex and State of Massachusetts, have invented a certain new and useful Improvement in Shipper Mechanism, of which the following is a specification, reference being had therein to the accompanying drawings.

This invention has reference to improvements in shipper mechanisms for shipping or moving an operative driving device along a shaft.

The invention relates particularly to improvements in means for maintaining the driving device in the position to which it is shipped.

One object of the invention is to provide a thrust-resisting device capable of elongation without the interposition between the parts thereof of additional mechanism.

Another object of the invention is to so construct a thrust-resisting device, comprising a fixed member and a follower, that the follower is constantly in contact with the fixed member.

Another object of the invention is to improve the general construction of shipper mechanisms.

The invention consists in the two-part thrust-resisting member.

The invention also consists in a two-part thrust-resisting member, the meeting faces of which parts are furnished with cams, and means for so directing the movement of one of the parts that the cams of the movable member work over the cams of the fixed member.

The invention also consists in a two-part thrust-resisting member having their meeting faces furnished with cams, a sleeve reciprocally mounted on said member, and a connection between the sleeve and the parts of said member.

The invention also consists in the two-part thrust member having the cams, the bearings extending from said parts and the sleeve having channels in which said bearings work.

The invention also consists in such other novel features of construction and combination of parts as shall hereinafter be more fully described, and pointed out in the claims.

Figure 1:
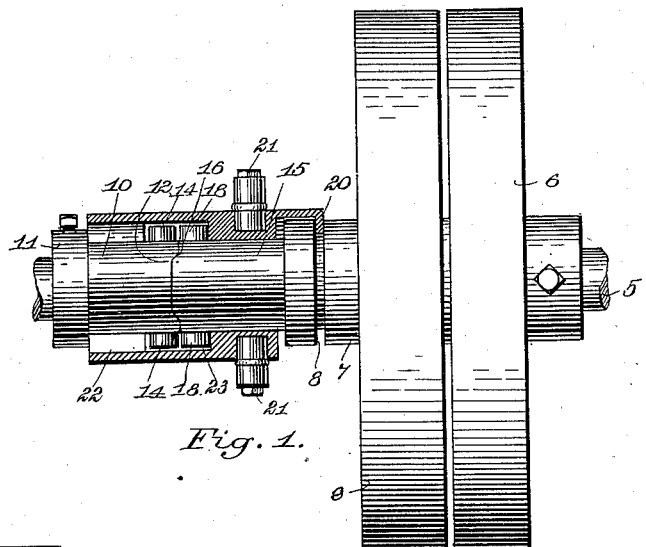
Figure 5:
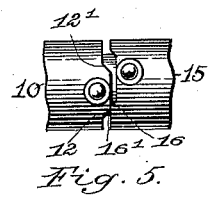
Figure 2:
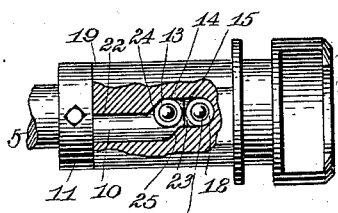
Figure 3:
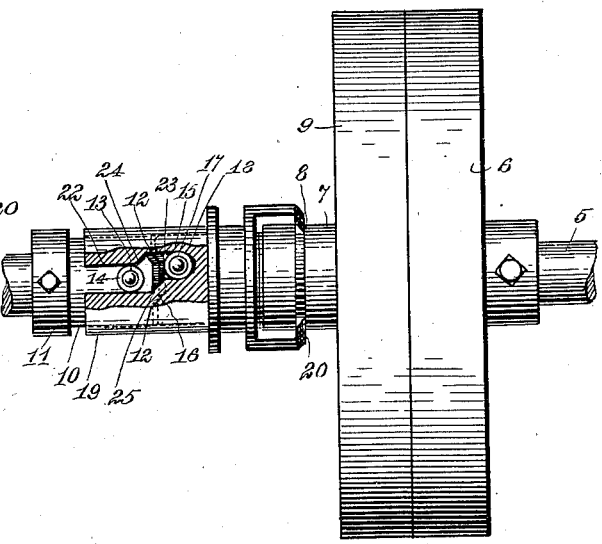
Figure 4:
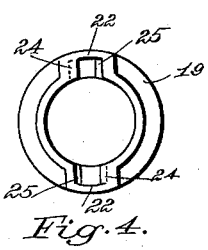

Figure 1 represents an elevation of a pair of friction-pulleys and the improved shipper thereof partially in section. Fig. 2 represents an elevation of the shipper partially broken away to show the relation of the bearings on the thrust members with the channels of the shipper-sleeve when in the unshipped position. Fig. 3 represents a similar view of the shipper, in combination with the friction-pulleys, showing the relation of the parts when in the shipped position. Fig. 4 represents an end view of portions of the collars forming the thrust-resisting device in the locked position; Fig. 5, a detail view of portions thereof, showing slight modifications of the cams on the collars.

Similar numbers of reference designate corresponding parts throughout.

In the drawings, 5 represents a shaft journaled in any suitable bearings, and 6 a friction member fixed on said shaft against independent rotation. 7 represents a hub loose on said shaft and having the annular groove 8 and the friction member 9, complemental to that marked 6, the member 9 being constantly driven by suitable power-transmitting means.

On the shaft 5, at a distance from the end of the hub 7, is fixed the collar 10, having the annular shoulder 11 and furnished at its forward end with a series of cam-faces, as 12, having ends, as 12', and from the surface of the collar, between the cam-faces, extend pins, as 13, on which are mounted the antifriction-sleeves 14 14. Between the end of the collar 10 and the hub 7 is loosely mounted on the shaft 5, for independent rotation and reciprocation, the collar 15, having at its rear end cams, as 16, with ends, as 16', which bear against the cams, as 12, of the collar 10. Also on the collar 15 are pins, as 17, which in the retracted position of the collar assume the position shown in Fig. 2 in relation to the pins 13 and carry antifriction-sleeves 18 18. It will thus be seen, as shown in Fig. 1 of the drawings, that the collars 10 and 15 form a two-part thrust resistance to the hub 7 and that when partially rotated the collar 15 will by the working of its cams, as 16, against the cams, as 12, of the collar 10 be advanced in the direction of the hub, while the positive resistance offered by the material of the collars will be continuously maintained.

The shipper-sleeve 19 is freely movable on the collars 10 and 15, abutting against the shoulder 11. At its forward end it has the inwardly-turned lips 20, which engage in the groove 8 of the hub 7, and an annular groove in which portions 21 21 of any usual shipper mechanism enter. Along the sides of this sleeve 19 are formed channels which have the parallel extensions 22 and 23 offset from each other and connected by the inclined channel having the cam-faces 24 and 25, the channels being proportioned for the free working therein of the antifriction-sleeves 14 and 18.

To bring the member 9 into frictional driving contact with the member 6, the shipper is moved in the usual manner to throw the sleeve 19 forward. On the advancement of the shipper-sleeve 19 from the position shown in Figs. 1 and 2 the faces, as 24, of the inclined portions of the channels in said sleeve will ride against the antifriction-sleeves 14, and the collar 10 being fixed the sleeve 19 will be caused by such riding action to partially rotate until the extensions 22 of the channel are brought in line with said sleeves 14, and said sleeves 14 will partially enter the extensions 22. During this partial rotation of the shipper-sleeve 19 the collar 15 is correspondingly rotated by the engagements of its pins 17 and their sleeves 18 with the extensions 23 of the shipper-sleeve channels, and under this rotation the cams 16 of the collar 15, working over the cams 12 of the collar 10, will cause the advancement of the collar 15 in speed and degree dependent on the pitch of the cams 12 and 16, so that the degree of advancement of the collar 15 does not depend on the distance traversed by the shipper-sleeve 19 and may be more or less than such distance. When the shipper-sleeve 19 is fully advanced and the member 9 is brought into driving relation to the member 6, the parts assume approximately the positions shown in Fig. 3, the rearward movement of the collar 15 being prevented by the engagement of the sleeves 14 in the extensions 22 of the shipper-sleeve channels, this engagement holding the shipper-sleeve from rotation until said shipper-sleeve has been moved back sufficiently for the antifriction-sleeves 14 to enter the inclined portions of said channels. Upon the application of pressure to retract the shipper-sleeve 19 this sleeve first moves backward until the antifriction-sleeves 14 are disengaged from the extensions 22 of the shipper-sleeve channels. The cam-faces 25 of the inclined portions of the channels then work against the sleeves 14, and the retractive rotation of the shipper-sleeve and of the collar 15 continues until they reach their initial positions. (Shown in Figs. 1 and 2.)

When desired, the length of the cams 12 and 16 may be so proportioned to the shape of the channels in the shipper-sleeve 19 that before the sleeves 14 enter the extensions 22 of said channels the complete movement of the collar 15 is effected, and the ends 16' of the cams 16 ride onto the ends 12' of the cams 12, as is shown in Fig. 5, the final rotative action of the shipper-sleeve causing this movement, while the primary rotative action of the shipper-sleeve when retracted causes the simple rotation of the collar 15 until the ends 16' of the cams 16 move off the ends 12' of the cams 12.

It is evident that the channels in the shipper-sleeve 19 should be proportioned to permit of the required movement of such sleeve to accomplish the desired actuation of the collar 15; but beyond this I do not limit my invention as regards such channels. It is also understood that various modifications of the cams 12 and 16 and of the bearing-sleeves 14 and 18 may be utilized without materially varying the invention. The shipper-sleeve may also be reciprocal while held from rotation and the channels so modified in shape that the movement thereof over the projections or their equivalents on the movable collar will cause the partial rotation of this collar.

Having thus described my invention, I claim as new and desire to secure by Letters Patent—

1. A shipper comprising a fixed member having lateral extensions and a cam, a movable member having lateral extensions and a cam working against the cam of the fixed member, and means in engagement with extensions for causing the partial rotation of the movable member.

2. A shipper comprising a thrust member adapted to be fixed and having a cam, a member adapted to be movably mounted in relation to the fixed member and having a cam working on that of the fixed member, and a shipper-sleeve movably mounted on said members and furnished with means for causing the partial rotation of the movable member.

3. A shipper comprising a fixed member having a cam end, and a movable member having a cam working on said end, a shipper-sleeve movably mounted on said members, connections between the sleeve and the fixed member whereby the sleeve is caused to rotate under a reciprocative movement, and connections between said sleeve and the movable member whereby rotative motion may be imparted from the sleeve to said member.

4. The combination with the collars 10 furnished with lateral projections as 13 and having the cams as 12, and the collar 15 furnished with projections as 17 and having cams as 16 working on the cams 12, of the shipper-sleeve 19 having the channels 22 and 23 with the inclined connection having the cams 24 and 25.

In testimony whereof I affix my signature in presence of two witnesses.

JOHN McCAFFREY.

Witnesses:
HENRY J. MILLER,
ARTHUR E. DENISON.